United States Patent
Baltrusch et al.

(10) Patent No.: US 10,683,083 B1
(45) Date of Patent: Jun. 16, 2020

(54) SATCOM BASED MESSAGING AND LOCATOR SYSTEM

(71) Applicant: SURVICE Engineering Company, Belcamp, MD (US)

(72) Inventors: Robert Eric Baltrusch, Newark, DE (US); Mark Thomas Butkiewicz, North East, MD (US); Shawn Thomas Recker, Bel Air, MD (US); Joel Henry Witman, Essex, MD (US)

(73) Assignee: SURVICE Engineering Company, Belcamp, MD (US)

( * ) Notice: Subject to any disclaimer, the term of this patent is extended or adjusted under 35 U.S.C. 154(b) by 0 days.

(21) Appl. No.: 16/558,129

(22) Filed: Sep. 1, 2019

Related U.S. Application Data

(63) Continuation-in-part of application No. 16/170,547, filed on Oct. 25, 2018, now abandoned.

(51) Int. Cl.
*B64C 19/00* (2006.01)

(52) U.S. Cl.
CPC .................... *B64C 19/00* (2013.01)

(58) Field of Classification Search
CPC ............ B64C 2201/128; B64C 2201/145
See application file for complete search history.

(56) References Cited

U.S. PATENT DOCUMENTS

| 8,267,000 | B1* | 9/2012 | Larson | F42C 11/002 |
| | | | | 102/215 |
| 8,930,044 | B1* | 1/2015 | Peeters | B64C 19/00 |
| | | | | 701/2 |
| 9,265,187 | B2* | 2/2016 | Cavender-Bares | A01C 7/00 |
| 10,054,939 | B1* | 8/2018 | Applewhite | B64C 11/04 |
| 2016/0012411 | A1* | 1/2016 | Kursun | G06Q 20/3221 |
| | | | | 705/42 |
| 2016/0068265 | A1* | 3/2016 | Hoareau | G05D 1/102 |
| | | | | 701/3 |
| 2016/0376031 | A1* | 12/2016 | Michalski | B64C 39/024 |
| | | | | 701/15 |
| 2017/0011339 | A1* | 1/2017 | Buford | G06Q 10/0835 |
| 2017/0041763 | A1* | 2/2017 | Jalali | G01S 5/14 |
| 2017/0069214 | A1* | 3/2017 | Dupray | G08G 5/0021 |
| 2018/0191890 | A1* | 7/2018 | Ham | H04M 1/725 |
| 2019/0055015 | A1* | 2/2019 | Allard | B64C 39/024 |

* cited by examiner

*Primary Examiner* — David Bilodeau
(74) *Attorney, Agent, or Firm* — Peter Loffler

(57) ABSTRACT

An integrated logistics asset guidance system uses a handheld housing that is programmed by a user to formulate a brief discrete message. The message is combined with a GPS coordinate captured by a GPS receiver within the housing with the message and coordinate are transmitted by a satcom transmitter within the housing using military secure encrypted communications protocols to a base station transceiver via a satellite. The transceiver retransmits the GPS coordinate and message via the satellite to a logistics asset so that the logistics asset can travel to the location indicated by the GPS coordinate, the logistics asset delivering supplies requested by the message sent.

15 Claims, 5 Drawing Sheets

SATCOM BASED MESSAGING AND LOCATOR SYSTEM

This application is a Continuation-In-Part of U.S. patent application Ser. No. 16/170,547, filed on Oct. 25, 2018, which application is incorporated herein by reference in its entirety.

GOVERNMENT INTERESTS

This invention was made with Government support under Other Transaction Agreement Number W15QKN-14-9-1001 awarded by the United States Army Contracting Command-New Jersey (ACC-NJ). The Government has certain rights in the invention.

BACKGROUND OF THE INVENTION

1. Field of the Invention

The present invention relates to a small handheld device that is programmable by a user to input a message into the device and thereafter deliver the message to a remote relay station via secure encrypted satcom communication such that the message also includes the location of the device. Logistics assets are dispatched to the location based on the message sent and updated during assets travel.

2. Background of the Prior Art

A soldier in the field often has needs for various items such as water, food, ammunition, etc. While communicating the need and having the need acted on may be relatively straightforward for a soldier in a large formation or an established forward base of operation, such is not always the case for a remote soldier such as a lone forward air controller at or near enemy lines or a combatant that is pinned down. While such a soldier may have some communication equipment that is necessary to communicate with incoming aircraft or other logistics assets, such communication is designed primarily for the combat mission at hand. The soldier may communicate his or her need to a command and control aircraft, which can then relay the message, including the soldier's position, to the appropriate logistics command in order to fulfill the needs of the soldier.

Such a relay system is problematic. The relay aircraft or other command and control site may not necessarily have a direct link to the logistics command, so that one or more secondary message relays may need to be made, all with the hope that each relay of the message is accurate. Additionally, the soldier may need to move so that the soldier may need to update his or her position (or may not even know his or her position), possibly several times prior to delivery, again subject to the limitations of message relaying. Furthermore, oftentimes the soldier may be so close to the enemy so as to make talking into a communications handset, even in a very quiet voice, problematic at best. A solider on the move may need to break voice silence many times during the course of the supply delivery process, often at potentially great peril.

What is needed is a system that can assist a soldier in resupplying his or her immediate needs without the attendant drawbacks currently experienced. Such a system must be able to quickly and efficiently deliver a message to the appropriate command without the need to relay the message through one or more intermediaries and without the need to break voice silence by the sender of the message. Such a system must be able to autonomously determine the requestor's position and update the position if the requestor needs to move prior to supply delivery.

SUMMARY OF THE INVENTION

The satcom based messaging and locator system of the present invention addresses the aforementioned needs in the art by providing a small handheld device that a soldier can quickly and quietly program to relay a message via secure and encrypted satellite communication to a receiving server that can be located anywhere in the world. Part of the message sent by the satcom based messaging and locator system is the location of the device sending the message with the location being automatically determined by the device so that the delivery location can be pinpointed with ease and continuously updated if the soldier moves prior to delivery. The satcom based messaging and locator system is of relatively simple design and construction, being produced using standard manufacturing techniques for this type of device. The device is lightweight, ruggerized, and weather durable and is silent in operation and has a minimal visual profile within covert operational environments. Operation of the satcom based messaging and locator system is simplified and requires minimal user interaction.

The satcom based messaging and locator system is comprised of a small, rugged, handheld housing. A GPS receiver is disposed within the housing as is a satcom (Satellite Communication) transmitter (transmitter only, does not receive incoming wireless signals) that is capable of transmitting messages to a satellite. A programming button is located on the housing. A message is programmed via the programming button and stored by the control unit. A control unit is disposed within the housing and is in communication with the satcom transmitter, the GPS receiver and the programming button. The message is combined with a GPS coordinate captured by the GPS receiver and the message and the GPS coordinate are communicated to the satellite via the satcom transmitter such that the satellite relays the message and the GPS coordinate to the server. A feedback unit may be located on the housing for giving feedback on the message being programmed by the programming button which feedback unit may be one or more lights and/or a small display screen. A logistics asset, such as a drone, but may be a land vehicle or even a waterborne vehicle, has a receiver that receives communications from the satellite such that once the server receives the message and GPS coordinate, the GPS coordinate is sent to the logistics asset's receiver via the satellite and the logistics asset automatically travels to a location identified by the GPS coordinate. Once the original message is sent, and the housing unit is moved, a revised GPS coordinate can be captured by the GPS receiver and transmitted to the server via the satellite so that the server relays the revised GPS coordinate to the logistics asset so that the logistics asset can alter its travel plan and travel to the new located associated with the revised GPS coordinate.

BRIEF DESCRIPTION OF THE DRAWINGS

Similar reference numerals refer to similar parts throughout the several views of the drawings.

DESCRIPTION OF THE PREFERRED EMBODIMENT

Figure 1:
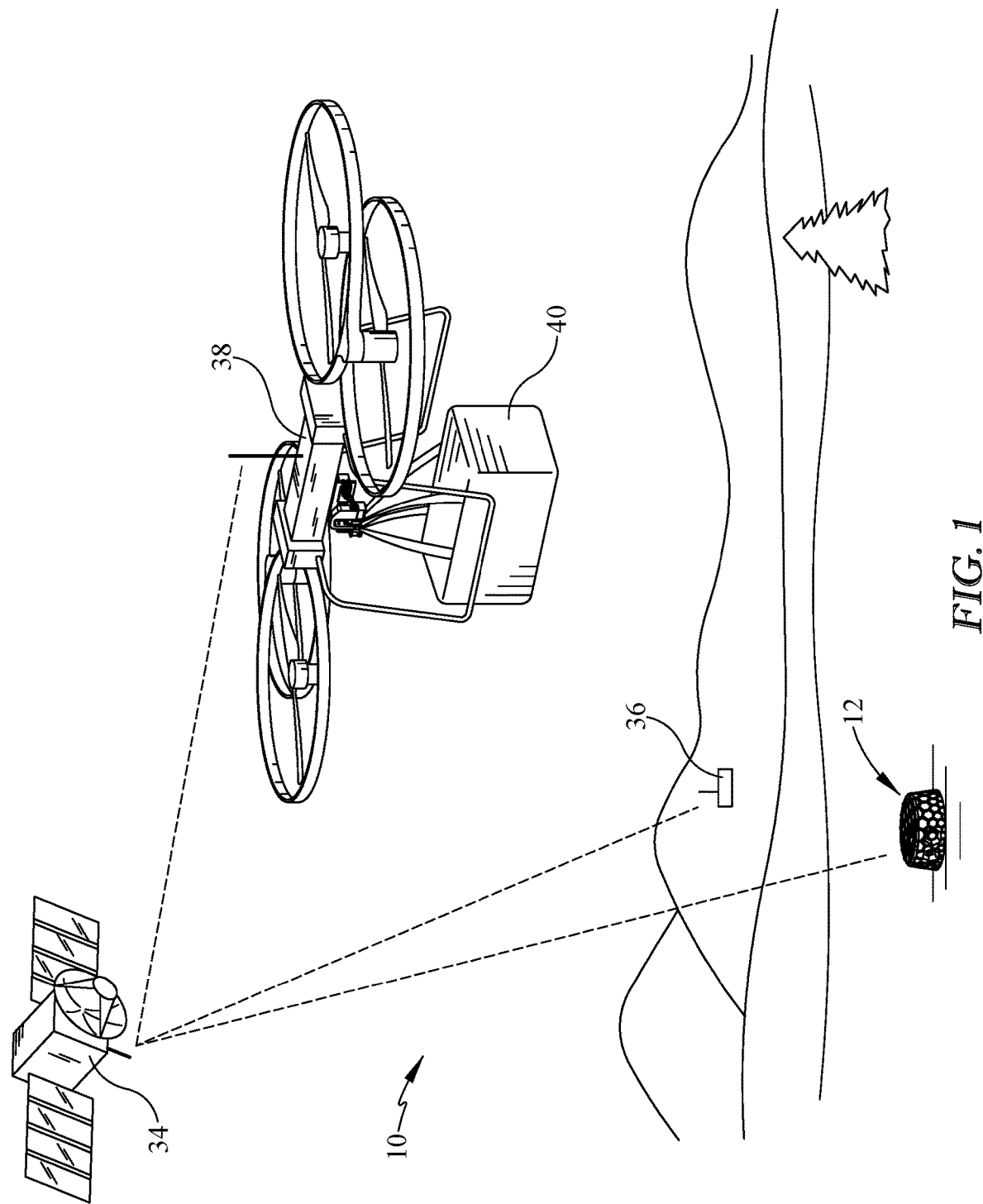
FIG. 1 is an environment view of the satcom based messaging and locator system of the present invention integrating a resupply delivery for a user.
Figure 2:
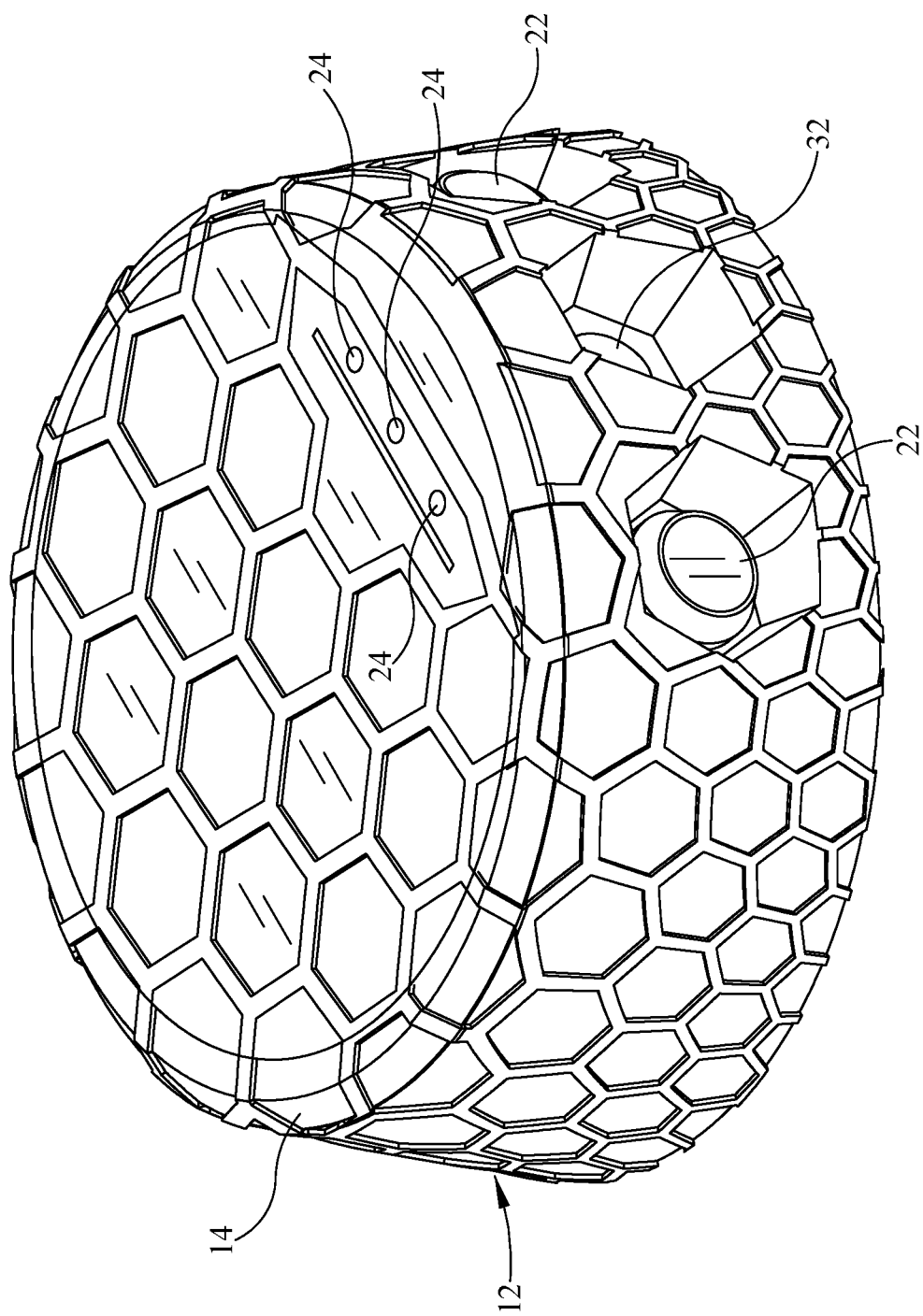
FIG. 2 is a perspective view of the communication unit of the satcom based messaging and locator system.
Figure 3:
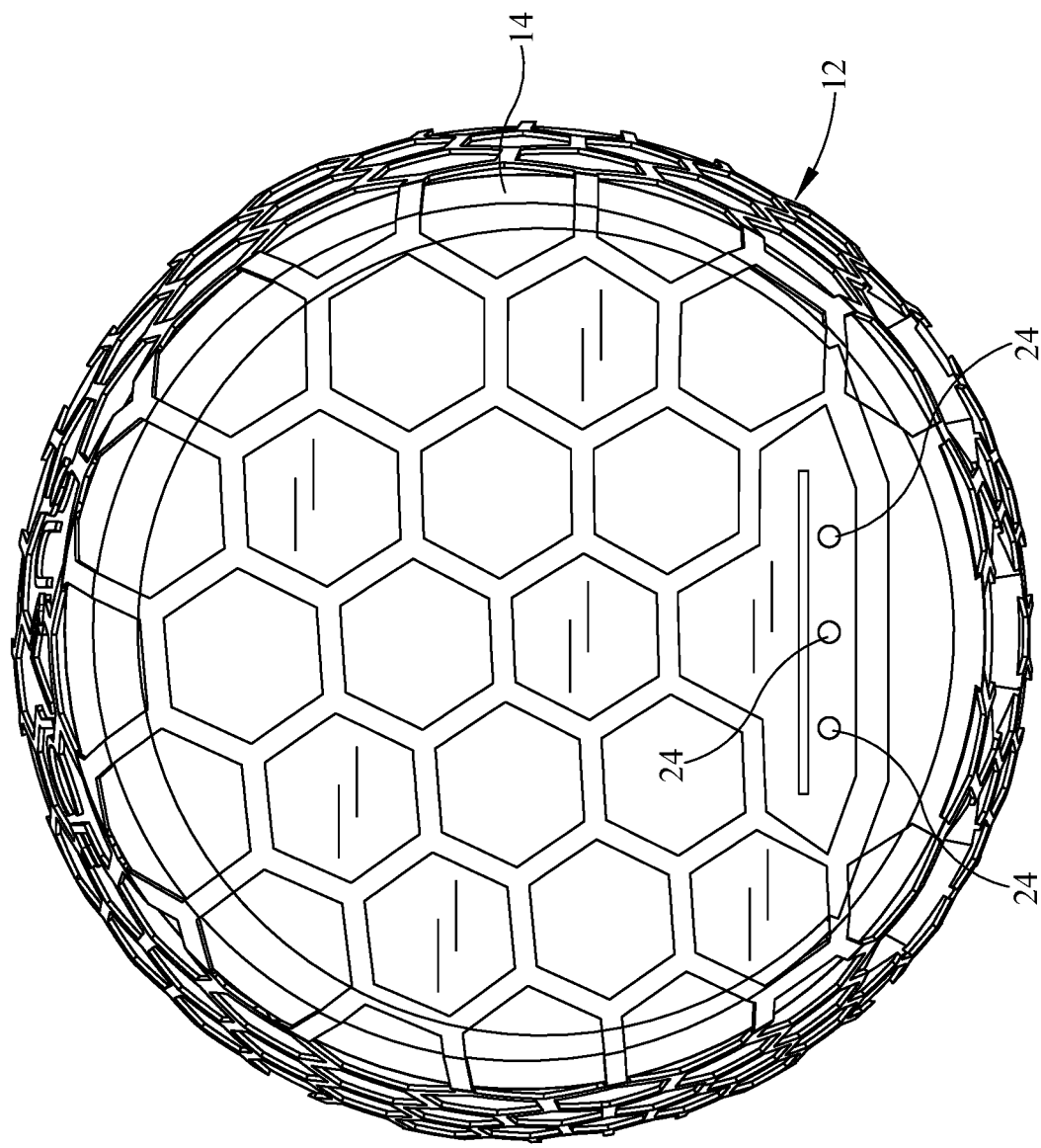
FIG. 3 is a top view of the communication unit of the satcom based messaging and locator system.
Figure 4:
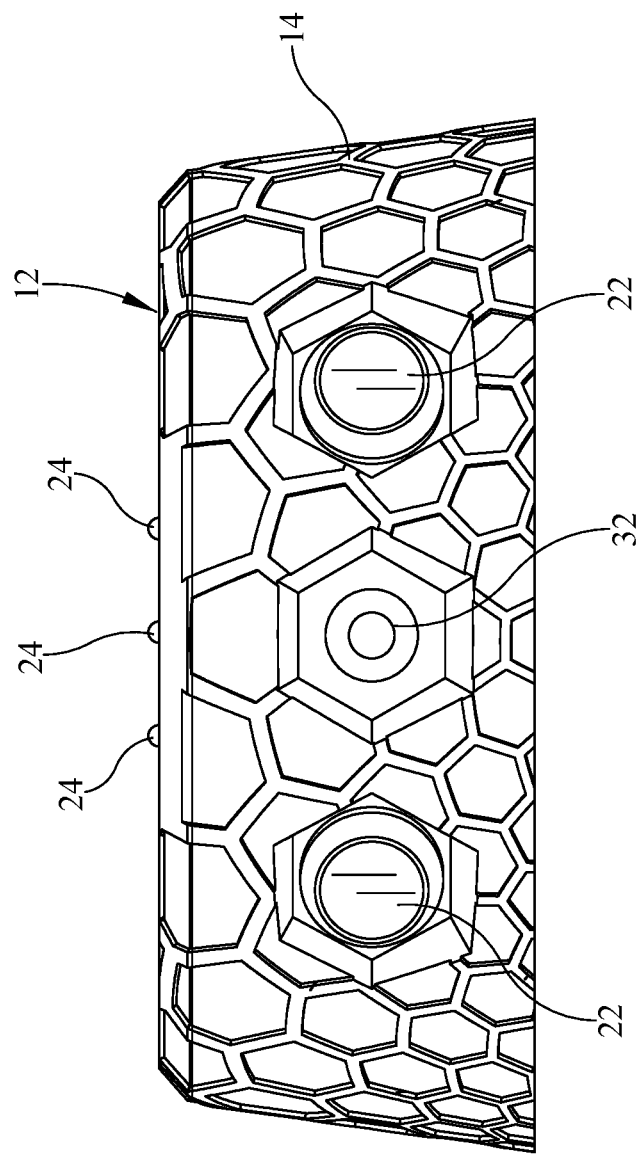
FIG. 4 is a front view of the communication unit of the satcom based messaging and locator system.
Figure 5:
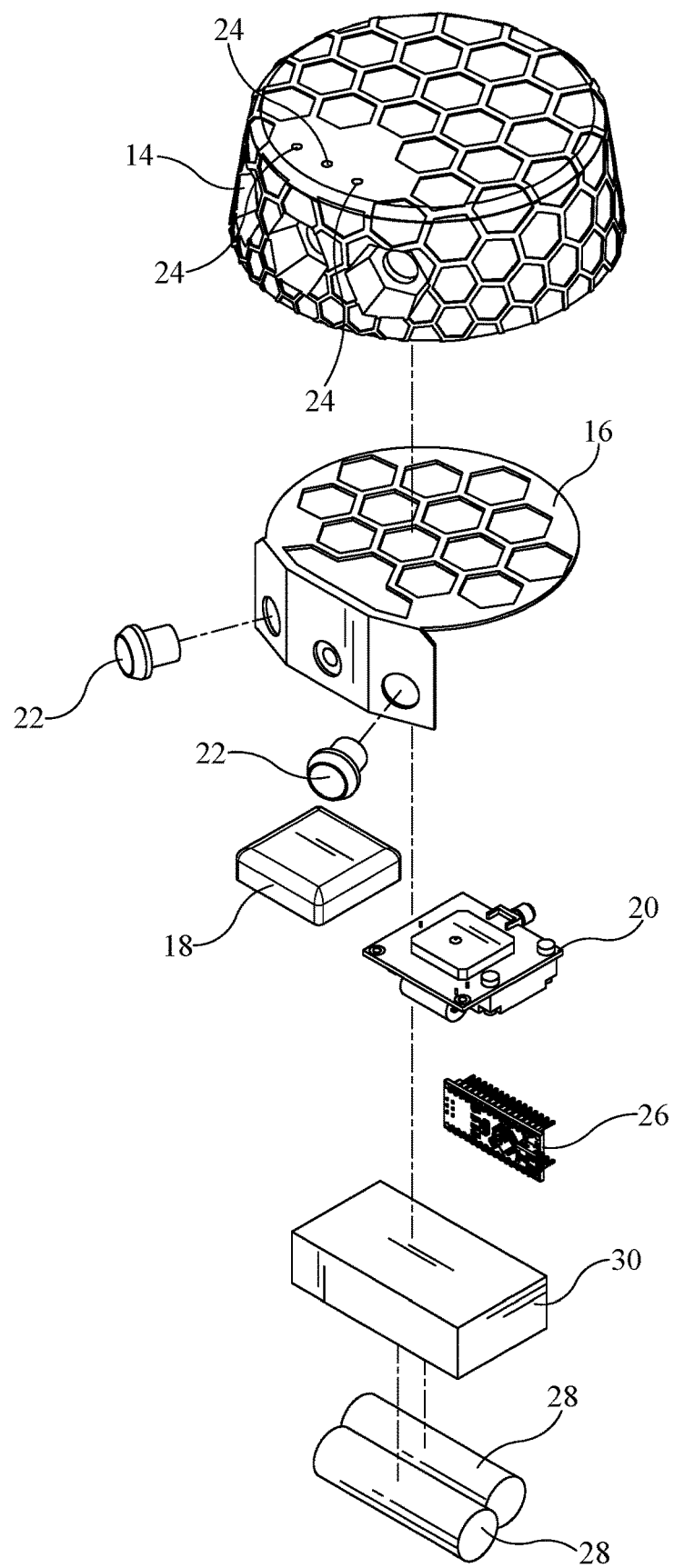
FIG. 5 is an exploded view of the communication unit of the satcom based messaging and locator system.

Referring now to the drawings, it is seen that the satcom based messaging and locator system of the present invention, generally denoted by reference numeral 10, is comprised of primarily a communication unit 12 that comprises a ruggerized housing 14, which may have a substructure 16 for casting purposes and which is made from an appropriate strong and lightweight material, such as epoxy, so that the satcom based messaging and locator system 10 can be used in the harshest environments as may be experienced by a combat soldier. The housing 14 is relatively small and easily handholdable (about the size of a typical residential smoke detector, more or less, with similar weight parameters) so that it is relatively easy to be a part of the equipment carried by the soldier. As seen, the main components of the communication unit 12 include a GPS (Global Positioning System) receiver 18, in communication with a satcom (Satellite Communications) transmitter 20, one or more push buttons 22, one or more lights (such as LEDs) 24, and a control circuit 26 for controlling the various components. A battery 28 is held within an appropriate holder 30 and provides electrical power for the various components. Advantageously, the battery is rechargeable in appropriate fashion via a plug-in port 32 located on the communication unit 12 in the usual way—the battery 28 may also be charged via a solar panel or other recharging method (wind generator, hand crank, etc.,—none illustrated) in addition to, or in lieu of the standard recharge method.

In operation, a user of the satcom based messaging and locator system 10 turns the communication unit 12 on via one of the push buttons 22. The user programs the communication unit 12 via the other button(s) 22 in some appropriate fashion. For example, the satcom based messaging and locator system 10 may be of very simple design so that the user can only "order" food, hydration or ammunition via the satcom based messaging and locator system 10 so that the user can quickly cycle through the seven different combinations of items needed via the button 22 with the lights 24 providing feedback as to where in the programming cycle the user is. The buttons 22 are preprogrammed so that the user selects from and executes a finite set of commands so as to make the device simple in operation from a user perspective. Once the user makes the desired selection, the user stops cycling with the button 22 and after a brief timeout interval, the satcom based messaging and locator system 10 places the order. This is accomplished by uploading the user's programmed in requirements along with the unit's GPS coordinate captured by the GPS receiver 18 to a satellite 34 via the satcom transmitter 20. The satellite 34 communicates with an appropriate server 36 which may be located virtually anywhere. The server 36 is a dedicated base station transceiver that automatically relays the message received from the transmitter 20 to an appropriate logistics asset such as the illustrated drone 38. The logistics asset 38 appropriately retrieves the requested load 40 and travels to the location associated with the GPS coordinate transmitted to it via the server 36 in appropriate fashion—either autonomously or with human assistance. Of course, the logistics asset need not necessarily be airborne and can be a land vehicle or even a waterborne asset. The logistics asset 38 has the appropriate hardware and software and/or firmware to receive such messages and be programmed to travel to the location associated with the GPS coordinate sent by the communication unit 12 and received by the logistics asset 38. Once the logistics asset 38 makes delivery, the logistics asset 38 returns to an appropriate location which may, by default, be the origination point or some other location as either preprogrammed or later uploaded via satellite 34 communication. The soldier can dispatch the logistics asset 38 for its return journey in some appropriate fashion.

The communication unit 12 is sufficiently small so that once the user programs the communication unit 12, the device is simply dropped onto the ground or thrown a short distance to an open area suitable to receive the logistics asset 38. Of course, the user can carry the device along if the user needs to move prior to logistics asset 38 arrival.

The transmitter 20 used by the satcom based messaging and locator system 10 is a transmitter only (it does not receive any incoming wireless and the satcom based messaging and locator system 10 holds no speakers or other sound producing devices) and does not transmit any voice communications, only the discrete preprogrammed commands selected by the user along with the GPS coordinates. The transmitter relies solely on satellite communication across discrete and dedicated UHF/VHF frequencies and does not transmit in any way across any cellular telephone networks. The transmitter 20 transmits over military secure encrypted communication systems. Such secure communication also entails digitally signing each individual data packet transmitted by the transmitter 20. The data packet so transmitted can only be decrypted at the receiving end by passing a validation test using the digital signature. Cryptokeys are intentionally not stored on any server associated with the satcom based messaging and locator system 10 so that only the logistics asset 38 holds the keys necessary to assure communication. In order to be considered a secure communication protocol, this protocol also implements a "one-time-password" feature, which is included in the (secure/encrypted) logistics asset 38 "heartbeat" signal. if the user sends a command to the logistics asset 38, the command must use this one-time-password, the use of which generates a new one-time-password on the logistics asset 38 for subsequent heartbeat signals. This prevents an adversary from using/sending copies of the same message to a logistics asset 38 and potentially launch a denial-of-service attack. The logistics asset 38 will not accept future copies of a given message as the internal one-time-password is changed with each command sent to the logistics asset 38. The use of a military secure encrypted communication protocol is substantially more sophisticated from a hardware, software and firmware point of view with respect to typical communication protocols, such as those used by a cellular network or similar communication means, but assures that messages being sent by the transmitter 20 are not intercepted and decoded by unintended listeners. Such a level of sophistication and hardening of the satcom based messaging and locator system 10 is not practical to implement on a cellular or similar wireless network as being fundamentally uneconomical and would be of little practical value.

The satcom based messaging and locator system 10 may transmit its signals continuously so that the user selected commands are tagged with the current GPS coordinates so that if the user moves after placement of the order, the transmitter 20 transmits the revised GPS coordinate to the server 36 via the satellite 34 and the server 36 communicates the revised GPS coordinate to the logistics asset 38 via the satellite 34, which redirects the logistics asset 38 to the revised location (if the logistics asset 38 is already en route) so that the user gets the order even if on the move. This process is executed automatically so that the soldier can concentrate on the task at hand without the need to manually intervene to update the location coordinates being sent.

The travel path of the logistics asset 38 is monitored in appropriate fashion.

Of course, the satcom based messaging and locator system 10 can be used for more sophisticated orders—for example, being able to order more than one type of ordinance—and may use a more sophisticated programming methodology such as a numeric or even an alphanumeric entry pad (neither illustrated) and may also have a more sophisticated feedback system instead of or in addition to the lights 24, such as a small display screen (not illustrated).

While the invention has been particularly shown and described with reference to an embodiment thereof, it will be appreciated by those skilled in the art that various changes in form and detail may be made without departing from the spirit and scope of the invention.

We claim:

1. A communication system comprising:
   a housing;
   a GPS receiver disposed within the housing;
   a satcom (satellite communication) transmitter disposed within the housing, the satcom transmitter adapted to communicate with a satellite;
   a programming button located on the housing;
   a control unit disposed within the housing in communication with the GPS receiver, the satcom transmitter and the programming button;
   a logistics asset having a logistics asset receiver, the logistics asset receiver adapted to maintain communications between itself and the satellite; and
   wherein, a discrete message is programmed via the programming button so that the message is stored by the control unit and the message is combined with a GPS coordinate captured by the GPS receiver and the message and the GPS coordinate are transmitted to the satellite via the satcom transmitter such that the satellite relays the message and the GPS coordinate to the logistics asset receiver, the message being transmitted using a military secure encrypted communication protocol wherein the message is digitally signed prior to being transmitted by the satcom transmitter in order to permit the message to be transmitted via the military secure encrypted communication protocol, and wherein the logistics asset has a heartbeat signal that includes a single use password such that the logistics asset must use the single use password to decrypt the message.

2. The communication system as in claim 1 further comprising a feedback unit located on the housing for giving feedback on the message being programmed by the programming button.

3. The communication system as in claim 2 wherein the feedback unit is a light.

4. The communication system as in claim 1 wherein the message is relayed to the logistics asset receiver via a base station transceiver.

5. The communication system as in claim 4 further comprising a feedback unit located on the housing for giving feedback on the message being programmed by the programming button.

6. The communication system as in claim 4 wherein the feedback unit is a light.

7. The communication system as in claim 1 wherein the logistics asset is an airborne vehicle.

8. The communication system as in claim 7 wherein the logistics asset is a drone.

9. The communication system as in claim 1 wherein the transmitter continuously transmits the message such that on each transmission of the message, the message is combined with a then current GPS coordinate then captured by the GPS receiver.

10. A method of directing a vehicle to a location comprising the steps of:
    providing a housing having a GPS receiver, a satcom (satellite communication) transmitter adapted to communicate with a satellite, and a control unit disposed within the housing;
    providing a programming button located on the housing for programming a discrete message and storing the message on the control unit;
    providing a logistics asset having a logistics asset receiver;
    combining the message with a GPS coordinate captured by the GPS receiver and transmitting the message and the GPS coordinate to the logistics asset receiver using a military secure encrypted communication protocol, the message being digitally signed prior to being transmitted by the satcom transmitter in order to permit the message to be transmitted via the military secure encrypted communication protocol and the logistics asset has a heartbeat signal that includes a single use password such that the logistics asset must use the single use password to decrypt the message; and
    having the logistics asset travel to a location associated with the GPS coordinate received.

11. The method as in claim 10 further comprising a feedback unit located on the housing for giving feedback on the message being programmed by the programming button.

12. The method as in claim 10 wherein the feedback unit is a light.

13. The method as in claim 10 wherein the logistics asset is a drone.

14. The method as in claim 13 further comprising the steps of:
    having the GPS receive capture a revised GPS coordinate after the step of capturing the GPS coordinate;
    having the transmitter transmit the revised GPS coordinate to the logistics asset via the satellite after the step of transmitting the message and the GPS coordinate to the logistics asset receiver; and
    having the logistics asset alter its travel path so as to travel to a revised location associated with the revised GPS coordinate upon receiving the revised GPS coordinate.

15. The method as in claim 13 further comprising the steps of:
    having the GPS receive repeatedly capture a revised GPS coordinate after the step of capturing the GPS coordinate;
    having the transmitter repeatedly transmit the revised GPS coordinate to the logistics asset via the satellite after the step of transmitting the message and the GPS coordinate to the logistics asset receiver; and
    having the logistics asset alter its travel path so as to travel to a revised location associated with the revised GPS coordinate upon receiving the revised GPS coordinate.

* * * * *